June 9, 1925.   1,541,487

G. F. ECKART

TOBACCO STEMMING MACHINE

Filed May 21, 1923    3 Sheets-Sheet 1

Inventor:
George F. Eckart,
By Dyrenforth, Lee, Chritton & Wiles,
Attys.

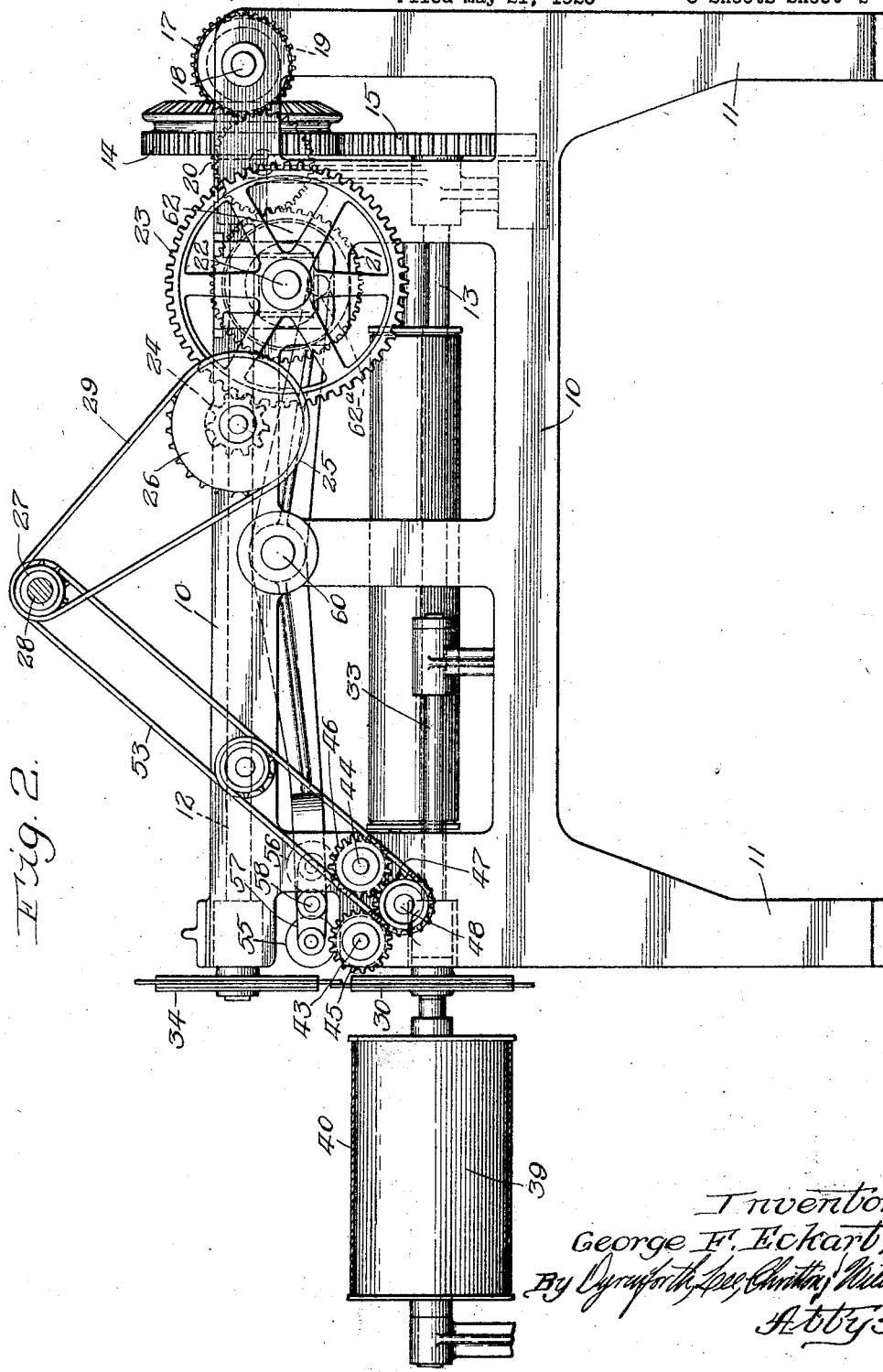

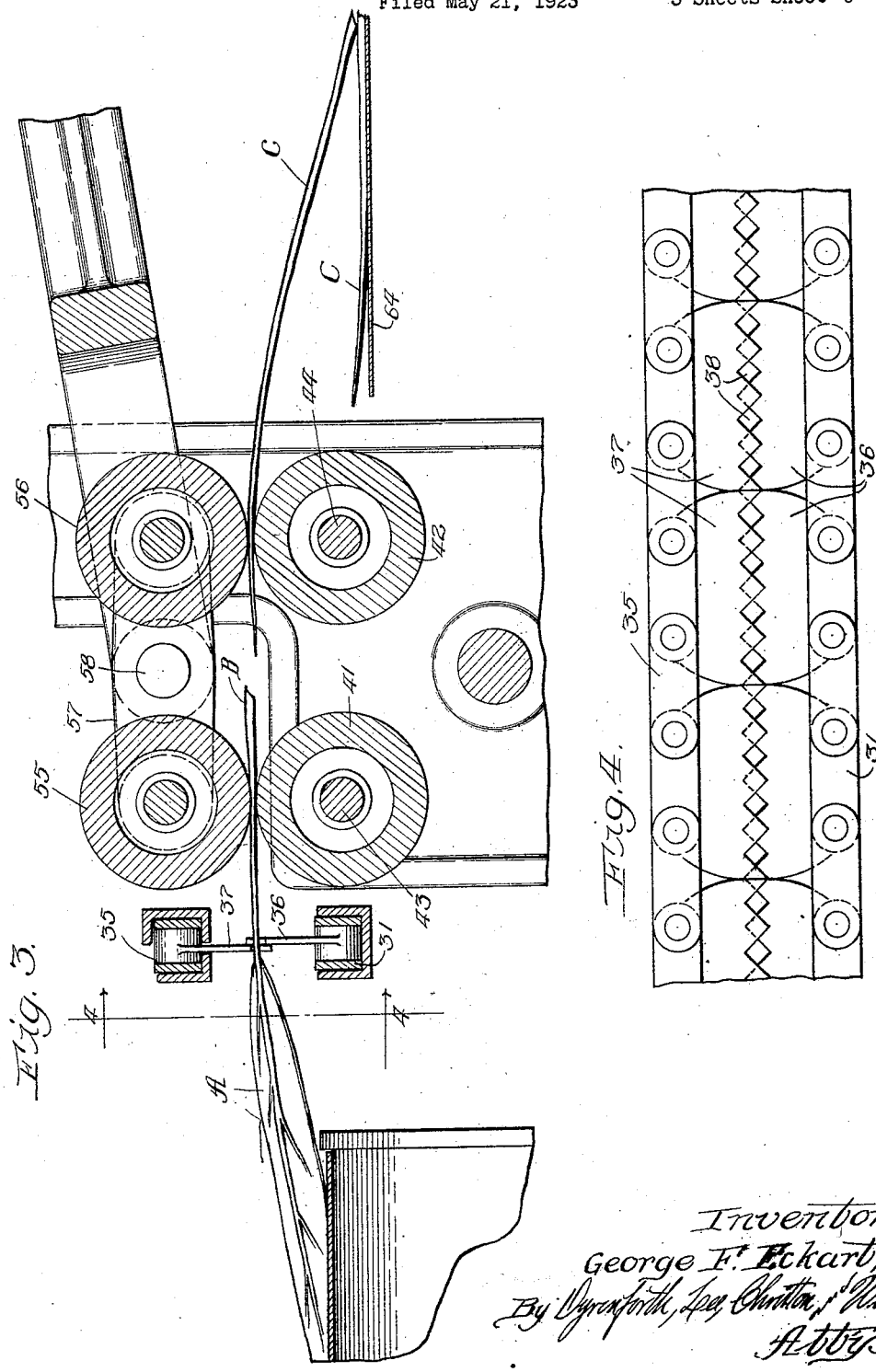

Patented June 9, 1925.

1,541,487

UNITED STATES PATENT OFFICE.

GEORGE F. ECKART, OF MISHAWAKA, INDIANA, ASSIGNOR TO AUTOMATIC STEMMER COMPANY, OF CHICAGO, ILLINOIS, A CORPORATION OF DELAWARE.

TOBACCO-STEMMING MACHINE.

Application filed May 21, 1923. Serial No. 640,401.

*To all whom it may concern:*

Be it known that I, GEORGE F. ECKART, a citizen of the United States, residing at Mishawaka, in the county of St. Joseph and State of Indiana, have invented new and useful Improvements in Tobacco-Stemming Machines, of which the following is a specification.

This invention relates to tobacco stemming machines and the like. The primary object of this invention is to provide a means for rapidly and efficiently stripping the leaves from tobacco stems.

This and other objects as will hereinafter appear are accomplished by this invention which is fully described in the following specification and shown in the accompanying drawings, in which:

Fig. 2 is a side elevation of the same;

Fig. 3 is a greatly enlarged section on the line 3—3 of Fig. 1; and

Fig. 4 is a side elevation of the chain taken on the line 4—4 of Fig. 3.

Figure 1:
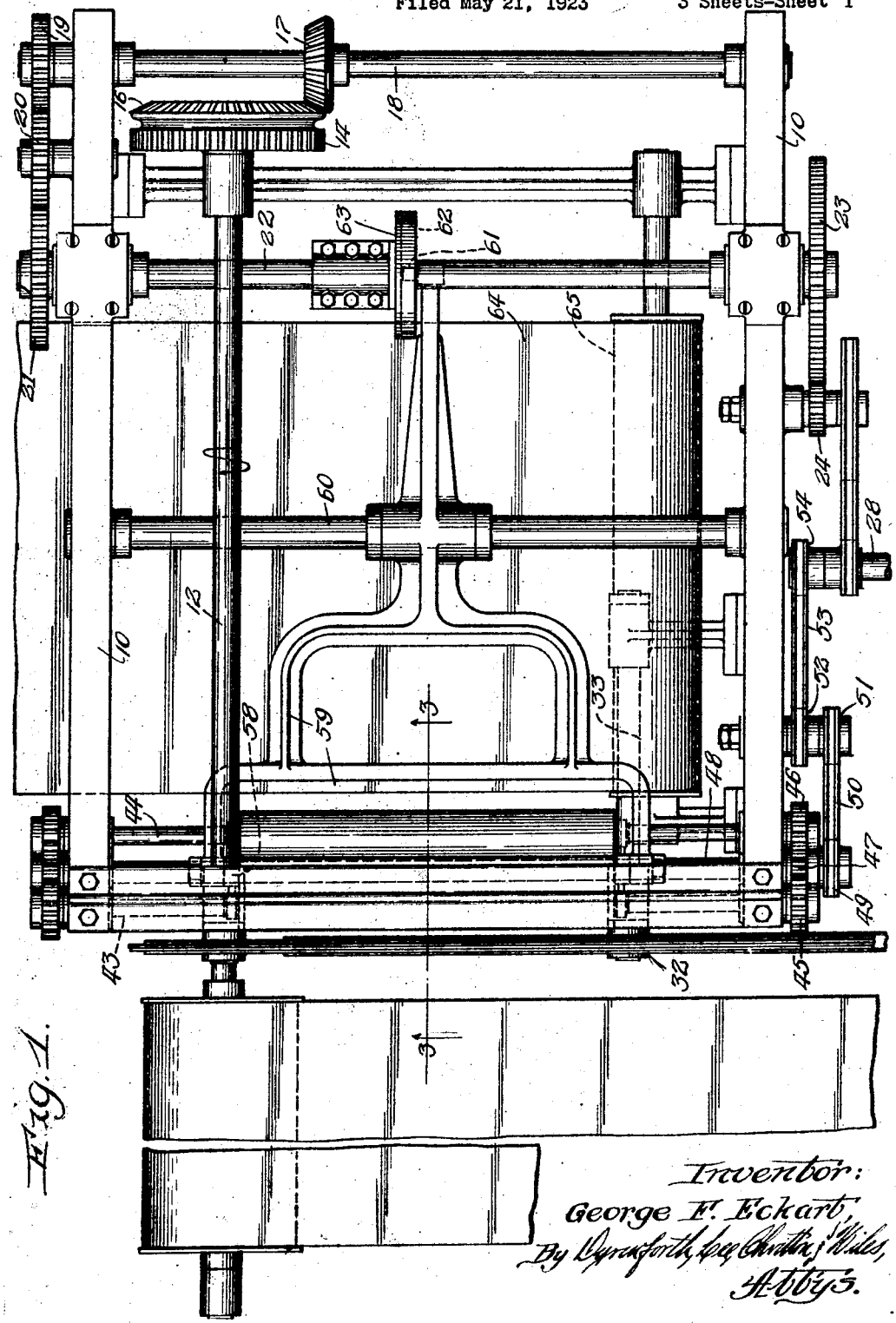
Figure 1 is a top plan view of the machine.

The embodiment shown comprises a main frame 10 supported on legs 11. Two parallel sprocket shafts 12 and 13 are journaled in bars carried by the main frame and have meshing gears 14 and 15 keyed thereon. The shaft 12 also carries a bevel gear 16 which meshes with the pinion 17 keyed on the shaft 18. This shaft is journaled in bearings carried by the main frame 10 and is driven by a gear 19 which meshes with an idler 20 and this in turn with a gear 21 on the shaft 22 which is likewise journaled in bars carried by the main frame 10.

The shaft 22 is driven by a gear 23 which meshes with a pinion 24 which is carried by a stub axle on the main frame 10. The pinion 24 is secured to a sprocket 26 which is driven by a sprocket 27 on the power shaft 28 through the sprocket chain 29.

The shaft 13 carries a sprocket 30 over which runs a chain 31 (Figs. 3 and 4) which passes around the sprocket 32 which is carried by a shaft 33 which is journaled in suitable bearings carried by the main frame. A similar sprocket 34 is carried by the shaft 12. A chain 35 which lies above the chain 31 passes around this sprocket and around another sprocket, not shown, which would be off the paper.

The two chains 31 and 35 are parallel and are driven at the same speed so that the two pass along together in the same relation as that shown in Fig. 4. These chains have blades 36 and 37 which have a series of overlapping notches which form a series of spaces 38.

A pulley 39 is carried to the end of the shaft 13. A belt 40 passes over this pulley and is driven at substantially the same lineal velocity as that of the chain 31.

It is thus apparent that as tobacco leaves A are laid on the belt 40 with their stems B overhanging the belt and extending beyond and beneath the chain 35, as the tobacco leaf approaches the sprocket 30 it will be carried up by the notches in the blades 37 and will fall into one of the spaces 38 as the two chains approach each other, as the chain 31 passes around the sprocket 30. At this point some means for gripping the tobacco stem B and pulling it through the blades 36 and 37 is required so that substantially all the tobacco leaf will be stripped from the stem. The means for doing this will now be described.

This gripping and feeding means comprises a pair of rolls 41 and 42 which are secured to shafts 43 and 44, which are driven by gears 45 and 46 which mesh with a gear 47 on the shaft 48. These three shafts are mounted in suitable bearings carried by the main frame. The shaft 48 is driven by a sprocket 49, the chain 50, the sprockets 51 and 52, the chain 53 from the sprocket 54 on the power shaft 28.

It will be observed that the rolls 41 and 42 are driven in a clock-wise direction as shown in Figs. 2 and 3. Idler rolls 55 and 56 are journaled in equalizer bars 57 which are pivotally mounted on pinions 58 in the bifurcated yoke member 59. This member is carried by a shaft 60 which is mounted in bars in the main frame 10; the opposite end of this member carries a cam follower 61 which engages a cam slot 62 in the facing of the cam 63 which is keyed to the shaft 22. The larger portion of the cam slot 62 is concentric with the axis of the shaft 22 and during the time the follower 61 is in this concentric portion of the cam slot the rolls 55 and 56 remain raised. The portion 62ª, however, of this cam slot curves in to the cam slot and as the cam follower 61 enters this portion of the cam slot the rolls 55 and 56 are forced down to the rolls 41 and 42.

These gears are so timed that a number of tobacco stems B are fed between the rolls 41 and 55 during the time the rolls 55 and 56 are raised. Then as the cam follower 61 enters the inwardly curved portion 62ᵃ of the cam slot the rolls 55 and 56 are forced down thereby gripping the tobacco stems B. The rolls 41 and 42 are continuously driven and consequently draw these stems through the notched blades 36 and 37, thereby stripping the tobacco as has been previously described.

The stripped stems C passing through the rolls 42 and 56 fall upon a belt 64 which passes around a pulley 65 and is driven from an outside source, not shown. These stems then pass out from the machine and may be subjected to an additional stripping process to remove if desired, any solid particles of tobacco leaves still remaining thereon.

As the cam follower 61 again leaves the portion 62ᵃ of the cam slot the rolls 55 and 56 are raised and a new bunch of tobacco stems may then be fed between the rolls 41 and 55 while the latter remains raised.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. A tobacco stripping machine comprising stripping members having notched edges, means for moving said members together with said notched edges in overlapping relation, a constantly rotating roller lying lengthwise of said members, a roller parallel to the first mentioned roller and normally held at a distance therefrom so that stems of tobacco leaves held between said members may be passed between said rollers, and means for moving said rollers together whereby the stems will be drawn through said members.

2. A tobacco stripping machine comprising two parallel chains having notched members on their adjacent sides and moving at substantially equal speeds, said notched members moving into overlapping relation at a predetermined point, pulling means lying adjacent to said chains when in overlapping relation, and means for intermittently causing said pulling means to operate to grip the overhanging ends of tobacco stems and draw them through said notched members.

3. A tobacco stripping machine comprising two parallel chains having notched members on their adjacent sides and moving at substantially equal speeds, said notched members moving into overlapping relation at a predetermined point, rollers lying parallel to said chains and adjacent thereto, one of said rollers being continuously driven, and means for intermittently separating said rollers to permit the insertion of the ends of tobacco stems therebetween and closing them to grip said stems and pull them through the notched members.

4. A tobacco stripping machine comprising two parallel chains having notched members on their adjacent sides and moving at substantially equal speeds, said notched members moving into overlapping relation at a predetermined point, rollers lying parallel to said chains and adjacent thereto, one of said rollers being continuously driven, means for intermittently separating said rollers to permit the insertion of the ends of tobacco stems therebetween and closing them to grip said stems and pull them through the notched members, and means for feeding tobacco leaves to said notched members.

5. A tobacco stripping machine comprising two parallel chains having notched members on their adjacent sides and moving at substantially equal speeds, said notched members moving into overlapping relation at a predetermined point, rollers lying parallel to said chains and adjacent thereto, one of said rollers being continuously driven, means for intermittently separating said rollers to permit the insertion of the ends of tobacco stems therebetween and closing them to grip said stems and pull them through the notched members, and a belt travelling at the same lineal speed as said chain for feeding tobacco leaves to said notched members.

Witness my hand and seal this first day of May 1923.

GEORGE F. ECKART. [L. S.]